US006421052B1

(12) United States Patent
McGuire

(10) Patent No.: US 6,421,052 B1
(45) Date of Patent: Jul. 16, 2002

(54) METHOD OF SEAMING AND EXPANDING AMORPHOUS PATTERNS

(75) Inventor: Kenneth S. McGuire, Wyoming, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/288,736

(22) Filed: Apr. 9, 1999

(51) Int. Cl.[7] .......................... G06T 11/20; G06T 17/20

(52) U.S. Cl. ........................................ 345/441; 345/423

(58) Field of Search ................................ 345/441, 423, 345/430, 620, 624

(56) References Cited

U.S. PATENT DOCUMENTS

| | | | |
|---|---|---|---|
| 680,533 | A | 8/1901 | Marinier et al. |
| 690,822 | A | 1/1902 | Avril |
| 1,358,891 | A | 11/1920 | Steedman |

(List continued on next page.)

FOREIGN PATENT DOCUMENTS

| | | |
|---|---|---|
| BE | 570960 | 9/1958 |
| EP | 0037101 A1 | 10/1981 |
| EP | 0621082 A1 | 10/1994 |

(List continued on next page.)

OTHER PUBLICATIONS

Martin Gardner—"Penrose Tiles ot Trapdoor Ciphers", Chapter 1 Penrose Tiling, pp. 1–18: (Pub. Mathematical Assn. of America—(1997).

Broughton, J., et al., "Porous Cellular Ceramic Membranes: A Stochastic Model To Describe the Structure of an Anodic Oxide Membrane", Journal of Membrane Science 106, pp. 89–101 (1995).

(List continued on next page.)

*Primary Examiner*—Jeffery Brier
*Assistant Examiner*—Anthony Blackman
(74) *Attorney, Agent, or Firm*—Stephen T. Murphy; David M. Weirich; Steven W. Miller

(57) ABSTRACT

The present invention provides a method for creating amorphous patterns based on a constrained Voronoi tesselation of 2-space that can be tiled. There are three basic steps required to generate a constrained Voronoi tesselation of 2-space: 1) nucleation point placement; 2) Delauney triangulation of the nucleation points; and 3) polygon extraction from the Delauney triangulated space. The tiling feature is accomplished by modifying only the nucleation point portion of the algorithm. The method of the present invention, for creating an amorphous two-dimensional pattern of interlocking two-dimensional geometrical shapes having at least two opposing edges which can be tiled together, comprises the steps of: (a) specifying the width $x_{max}$ of the pattern measured in direction x between the opposing edges; (b) adding a computational border region of width B to the pattern along one of the edges located at the x distance $x_{max}$; (c) computationally generating (x,y) coordinates of a nucleation point having x coordinates between 0 and $x_{max}$: (d) selecting nucleation points having x coordinates between 0 and B and copying them into the computational border region by adding $x_{max}$ to their x coordinate value; (e) comparing both the computationally generated nucleation point and the corresponding copied nucleation point in the computational border against all previously generated nucleation points; and (f) repeating steps (c) through (e) until the desired number of nucleation points has been generated. To complete the pattern formation process, the additional steps of: (g) performing a Delaunay triangulation on the nucleation points; and (h) performing a Voronoi tessellation on the nucleation points to form two-dimensional geometrical shapes are included. Patterns having two pairs of opposing edges which may be tiled together may be generated by providing computational borders in two mutually orthogonal coordinate directions.

10 Claims, 6 Drawing Sheets

U.S. PATENT DOCUMENTS

| | | | | |
|---|---|---|---|---|
| 3,867,225 | A | 2/1975 | Nystrand | 156/209 |
| 3,879,330 | A | 4/1975 | Lustig | 260/31.8 |
| 3,901,237 | A | 8/1975 | Cepuritis et al. | 128/284 |
| 3,911,187 | A | 10/1975 | Raley | 428/180 |
| 3,937,221 | A | 2/1976 | Tritsch | 128/287 |
| 3,943,609 | A | 3/1976 | Egan, Jr. | 24/73 |
| 3,950,480 | A | 4/1976 | Adams et al. | 264/284 |
| 3,967,624 | A | 7/1976 | Milnamow | 128/287 |
| 4,023,570 | A | 5/1977 | Chinal et al. | 128/290 |
| 4,054,697 | A | 10/1977 | Reed et al. | 428/40 |
| 4,061,820 | A | 12/1977 | Magid et al. | 428/311 |
| 4,067,337 | A | 1/1978 | Ness | 128/287 |
| 4,133,152 | A | 1/1979 | Penrose | 52/105 |
| 4,181,752 | A | 1/1980 | Martens et al. | 427/54.1 |
| 4,273,889 | A | 6/1981 | Yamazaki et al. | 525/109 |
| 4,303,485 | A | 12/1981 | Levens | 204/159.24 |
| 4,325,768 | A | 4/1982 | Schulz | 156/206 |
| 4,336,804 | A | 6/1982 | Roeder | 128/290 |
| 4,337,772 | A | 7/1982 | Roeder | 128/290 |
| 4,339,088 | A | 7/1982 | Niedermeyer | 242/1 |
| 4,342,314 | A | 8/1982 | Radel et al. | 128/287 |
| 4,376,147 | A | 3/1983 | Byrne et al. | 428/167 |
| 4,376,440 | A | 3/1983 | Whitehead et al. | 604/387 |
| 4,392,897 | A | 7/1983 | Herrington | 156/66 |
| 4,397,905 | A | 8/1983 | Detmer et al. | 428/180 |
| 4,404,242 | A | 9/1983 | Squier | 428/35 |
| 4,405,666 | A | 9/1983 | Squier | 428/35 |
| 4,410,130 | A | 10/1983 | Herrington | 383/62 |
| 4,413,109 | A | 11/1983 | Haas | 526/348 |
| 4,460,634 | A | 7/1984 | Hasegawa | 428/124 |
| 4,508,256 | A | 4/1985 | Radel et al. | 228/152 |
| 4,509,908 | A | 4/1985 | Mullane, Jr. | 425/290 |
| 4,514,345 | A | 4/1985 | Johnson et al. | 264/22 |
| 4,519,095 | A | 5/1985 | Clayton | 383/86 |
| 4,528,239 | A | 7/1985 | Trokhan | 428/247 |
| 4,543,142 | A | 9/1985 | Kuepper et al. | 156/209 |
| 4,546,029 | A | 10/1985 | Cancio et al. | 428/141 |
| 4,556,595 | A | 12/1985 | Ochi | 428/143 |
| 4,576,850 | A | 3/1986 | Martens | 428/156 |
| 4,578,069 | A | 3/1986 | Whitehead et al. | 604/370 |
| 4,587,152 | A | 5/1986 | Gleichenhagen et al. | 428/195 |
| 4,612,221 | A | 9/1986 | Biel et al. | 428/35 |
| 4,655,761 | A | 4/1987 | Grube et al. | 604/389 |
| 4,659,608 | A | 4/1987 | Schulz | 428/171 |
| 4,695,422 | A | 9/1987 | Curro et al. | 264/504 |
| 4,699,622 | A | 10/1987 | Toussant et al. | 604/389 |
| 4,743,242 | A | 5/1988 | Grube et al. | 604/389 |
| 4,778,644 | A | 10/1988 | Curro et al. | 264/557 |
| 4,803,032 | A | 2/1989 | Schulz | 264/284 |
| 1,454,364 | A | 5/1923 | Winchenbaugh et al. | |
| 2,054,313 | A | 9/1936 | Bright | |
| 2,338,749 | A | 1/1944 | Wilbur | 24/67 |
| 2,681,612 | A | 6/1954 | Reimann | 101/25 |
| 2,838,416 | A | 6/1958 | Babiarz et al. | 117/11 |
| 2,855,844 | A | 10/1958 | Stewart | 101/23 |
| 2,861,006 | A | 11/1958 | Salditt | 117/7 |
| 3,018,015 | A | 1/1962 | Agriss et al. | 217/53 |
| 3,024,154 | A | 3/1962 | Singleton et al. | 156/209 |
| 3,312,005 | A | 4/1967 | McElroy | 40/2 |
| 3,386,846 | A | 6/1968 | Lones | 117/11 |
| 3,484,835 | A | 12/1969 | Trounstine et al. | 161/130 |
| 3,554,835 | A | 1/1971 | Morgan | 156/234 |
| 3,573,136 | A | 3/1971 | Gardner | 156/384 |
| 3,585,101 | A | 6/1971 | Stratton et al. | 161/116 |
| 3,592,722 | A | 7/1971 | Morgan | 161/148 |
| 3,708,366 | A | 1/1973 | Donnelly | 156/209 |
| 3,850,095 | A | 11/1974 | Snyder | 101/32 |
| 3,853,129 | A | 12/1974 | Kozak | 128/287 |
| 4,820,589 | A | 4/1989 | Dobreski et al. | 428/422 |
| 4,839,216 | A | 6/1989 | Curro et al. | 428/134 |
| 4,894,275 | A | 1/1990 | Pelzar | 428/166 |
| 4,946,527 | A | 8/1990 | Battrell | 156/60 |
| 4,959,265 | A | 9/1990 | Wood et al. | 428/343 |
| 5,008,139 | A | 4/1991 | Ochi et al. | 428/40 |
| 5,080,957 | A | 1/1992 | Leseman et al. | 428/167 |
| 5,098,522 | A | 3/1992 | Smurkoski et al. | 162/358 |
| 5,112,674 | A | 5/1992 | German et al. | 428/216 |
| 5,116,677 | A | 5/1992 | Jones | 428/349 |
| 5,141,790 | A | 8/1992 | Calhoun et al. | 428/40 |
| 5,165,982 | A | 11/1992 | Gubitz et al. | 428/156 |
| D331,665 | S | 12/1992 | Underhill | D5/53 |
| 5,175,049 | A | 12/1992 | Huff et al. | 428/218 |
| 5,176,939 | A | 1/1993 | Shepherd | 427/146 |
| 5,208,096 | A | 5/1993 | Dohrer | 428/218 |
| 5,215,617 | A | 6/1993 | Grupe | 156/209 |
| 5,215,804 | A | 6/1993 | Hagens et al. | 428/156 |
| 5,221,276 | A | 6/1993 | Battrell | 604/389 |
| 5,245,025 | A | 9/1993 | Trokhan et al. | 536/56 |
| 5,246,762 | A | 9/1993 | Nakamura | 428/172 |
| 5,269,776 | A | 12/1993 | Lancaster et al. | 604/387 |
| 5,273,805 | A | 12/1993 | Calhoun et al. | |
| 5,273,809 | A | 12/1993 | Simmons | 428/212 |
| 5,275,588 | A | 1/1994 | Matsumoto et al. | 604/372 |
| 5,296,277 | A | 3/1994 | Wilson et al. | 428/40 |
| 5,300,347 | A | 4/1994 | Underhill et al. | 428/171 |
| 5,310,587 | A | 5/1994 | Akahori et al. | 428/35.2 |
| 5,324,279 | A | 6/1994 | Lancaster et al. | 604/387 |
| 5,334,428 | A | 8/1994 | Dobreski et al. | 428/34.9 |
| 5,339,730 | A | 8/1994 | Ruppei et al. | 101/32 |
| 5,342,344 | A | 8/1994 | Lancaster et al. | 604/387 |
| 5,344,693 | A | 9/1994 | Sanders | 428/167 |
| 5,382,464 | A | 1/1995 | Ruppel et al. | 428/172 |
| 5,428,726 | A * | 6/1995 | Piegl et al. | 345/441 |
| 5,436,057 | A | 7/1995 | Schulz | 428/156 |
| 5,453,296 | A | 9/1995 | Lauritzen et al. | 427/208.6 |
| 5,458,938 | A | 10/1995 | Nygard et al. | 428/40 |
| 5,487,929 | A | 1/1996 | Rusincovitch, Jr. et al. | 428/40 |
| 5,514,122 | A | 5/1996 | Morris et al. | 604/387 |
| 5,518,801 | A | 5/1996 | Chappell et al. | 428/152 |
| 5,527,112 | A | 6/1996 | Dais et al. | 383/211 |
| D373,026 | S | 8/1996 | Delebreau et al. | D5/20 |
| 5,550,960 | A * | 8/1996 | Shirman et al. | 345/582 |
| 5,575,747 | A | 11/1996 | Dais et al. | 493/213 |
| 5,585,178 | A | 12/1996 | Calhoun et al. | 428/343 |
| 5,589,246 | A | 12/1996 | Calhoun et al. | 428/120 |
| 5,597,639 | A | 1/1997 | Schulz | 428/156 |
| 5,622,106 | A | 4/1997 | Rayner | 101/32 |
| D381,810 | S | 8/1997 | Schultz et al. | D5/37 |
| 5,662,758 | A | 9/1997 | Hamilton et al. | |
| 5,686,168 | A | 11/1997 | Laurent et al. | 428/179 |
| 5,736,223 | A | 4/1998 | Laurent | 428/154 |
| 5,740,342 | A * | 4/1998 | Koeberger | 345/420 |
| 5,798,784 | A * | 8/1998 | Akiyama | 345/423 |
| 5,871,607 | A | 2/1999 | Hamilton et al. | 156/221 |
| 5,965,235 | A | 10/1999 | McGuire et al. | 428/156 |
| 5,965,255 | A * | 10/1999 | McGuire et al. | 428/156 |
| 6,100,893 | A * | 8/2000 | Ensz et al. | 345/420 |
| 6,106,561 | A * | 8/2000 | Farmer | 703/10 |
| 6,148,496 | A * | 11/2000 | McGuire et al. | 29/428 |
| 6,254,965 | B1 * | 7/2001 | McGuire et al. | 428/141 |

FOREIGN PATENT DOCUMENTS

| | | |
|---|---|---|
| EP | 0623332 A1 | 11/1994 |
| FR | 1315903 | 12/1962 |

| | | |
|---|---|---|
| FR | 1429312 | 1/1966 |
| GB | 975783 | 11/1964 |
| GB | 1069445 | 5/1967 |
| JP | 3-002292 | 1/1991 |
| JP | 07246216 | 9/1995 |
| WO | WO 92/00187 | 1/1992 |
| WO | WO 95/11945 | 5/1995 |
| WO | WO 95/31225 | 11/1995 |
| WO | WO 96/31652 | 10/1996 |
| WO | WO 97/18276 | 5/1997 |

OTHER PUBLICATIONS

Lim J.H.F., et al., "Statistical Models to Describe the Structure of Porous Ceramic Membranes", Separation Science and Technology, 28(1–3), pp. 821–854 (1993).

Watson, D.F., "Computing the n–dimensional Delaunay Tessellation with Application to Voronol Polytopes", The Computer Journal, vol. 24, No. 2, pp. 167–172 (1981).

* cited by examiner

METHOD OF SEAMING AND EXPANDING AMORPHOUS PATTERNS

FIELD OF THE INVENTION

The present invention relates to amorphous patterns useful in manufacturing three-dimensional sheet materials that resist nesting of superimposed layers into one another. The present invention further relates to a method of creating such patterns which permits the patterns to be seamed edge-to-edge with themselves or other identical patterns without interruptions in the form of visible seams in the pattern.

BACKGROUND OF THE INVENTION

The use of amorphous patterns for the prevention of nesting in wound rolls of three dimensional sheet products has been disclosed in commonly-assigned, co-pending (allowed) U.S. patent application Ser. No. 08/745,339, filed Nov. 8, 1996 in the names of McGuire, Tweddell, and Hamilton, entitled "Three-Dimensional, Nesting-Resistant Sheet Materials and Method and Apparatus for Making Same", the disclosure of which is hereby incorporated herein by reference. In this application, a method of generating amorphous patterns with remarkably uniform properties based on a constrained Voronoi tesselation of 2-space was outlined. Using this method, amorphous patterns consisting of an interlocking networks of irregular polygons are created using a computer.

The patterns created using the method described in the above mentioned application work quite well for flat, small materials. However, when one tries to use these patterns in the creation of production tooling (such as embossing rolls), there is an obvious seam where the pattern "meets" as it is wrapped around the roll due to the diverse edges of the pattern. Further, for very large rolls, the computing time required to generate the pattern to cover these rolls becomes overwhelming. What is needed then, is a method of creating these amorphous patterns that allows "tiling." As utilized herein, the terms "tile", "tiling", and "tiled" refer to a pattern or pattern element comprising a bounded region filled with a pattern design which can be joined edge-wise to other identical patterns or pattern elements having complementary but non-identical edge geometries to form a larger pattern having no visually-apparent seam. If such a "tiled" pattern were used in the creation of an embossing roll, there would be no appearance of a seam where flat the pattern "meets" as it is wrapped around the roll. Further, a very large pattern (such as the surface of a large embossing roll) could be made by "tiling" a small pattern, and there would be no appearance of a seam at the edges of the small pattern tiles.

Accordingly, it would be desirable to provide a method of creating amorphous patterns based on a constrained Voronoi tesselation of 2-space that can be "tiled" with no appearance of a seam at the tile edges.

SUMMARY OF THE INVENTION

The present invention provides a method for creating amorphous patterns based on a constrained Voronoi tesselation of 2-space that can be tiled. There are three basic steps required to generate a constrained Voronoi tesselation of 2-space: 1) nucleation point placement; 2) Delauney triangulation of the nucleation points; and 3) polygon extraction from the Delauney triangulated space. The tiling feature is accomplished by modifying only the nucleation point portion of the algorithm.

The method of the present invention, for creating an amorphous two-dimensional pattern of interlocking two-dimensional geometrical shapes having at least two opposing edges which can be tiled together, comprises the steps of: (a) specifying the width $x_{max}$ of the pattern measured in direction x between the opposing edges; (b) adding a computational border region of width B to the pattern along one of the edges located at the x distance $x_{max}$; (c) computationally generating (x,y) coordinates of a nucleation point having x coordinates between 0 and $x_{max}$; (d) selecting nucleation points having x coordinates between 0 and B and copying them into the computational border region by adding $x_{max}$ to their x coordinate value; (e) comparing both the computationally generated nucleation point and the corresponding copied nucleation point in the computational border against all previously generated nucleation points; and (f) repeating steps (c) through (e) until the desired number of nucleation points has been generated.

To complete the pattern formation process, the additional steps of: (g) performing a Delaunay triangulation on the nucleation points; and (h) performing a Voronoi tessellation on the nucleation points to form two-dimensional geometrical shapes are included. Patterns having two pairs of opposing edges which may be tiled together may be generated by providing computational borders in two mutually orthogonal coordinate directions.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Figure 1:
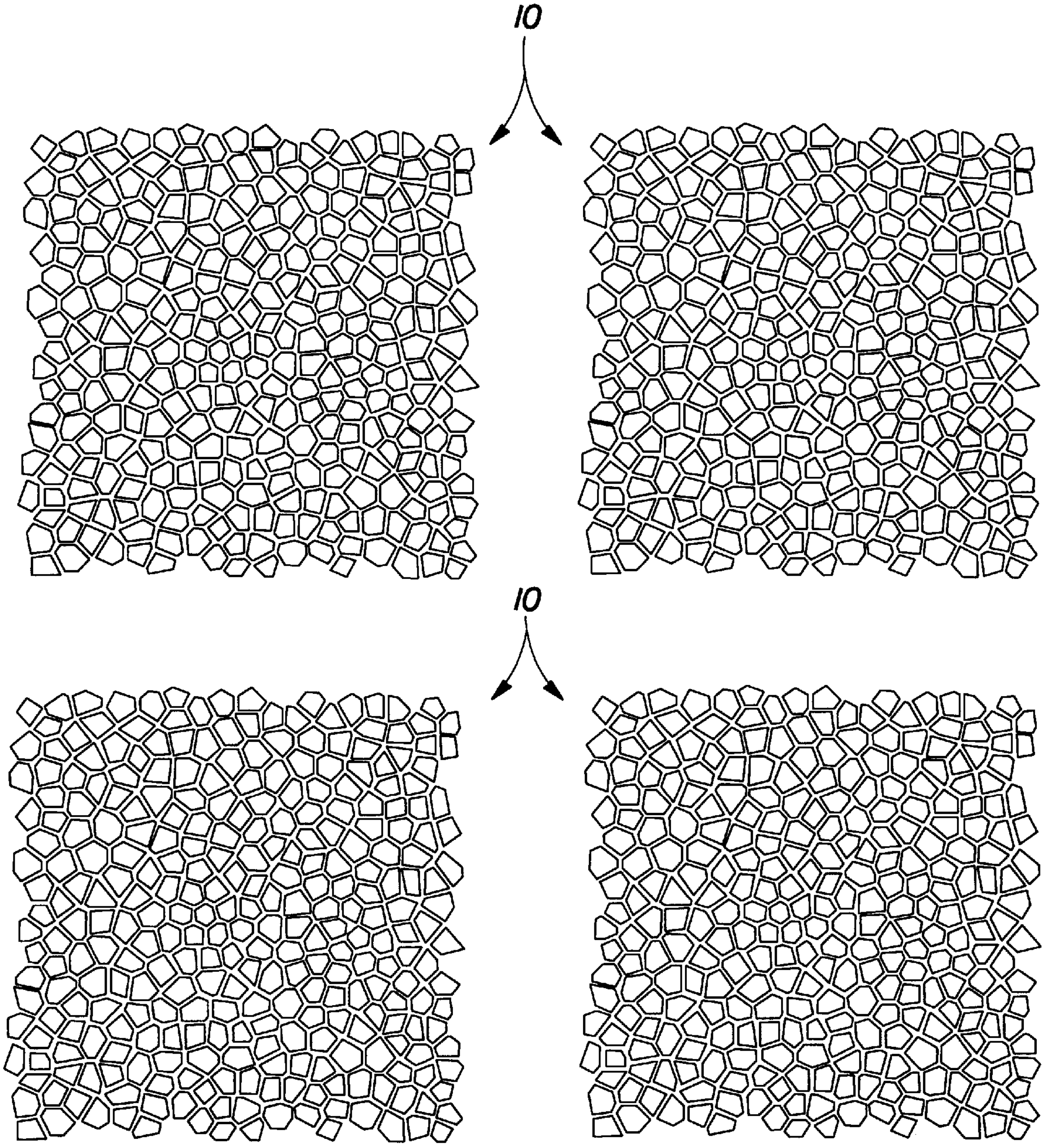
FIG. 1 PRIOR ART
FIG. 1 is a plan view of four identical "tiles" of a representative prior art amorphous pattern.
Figure 2:
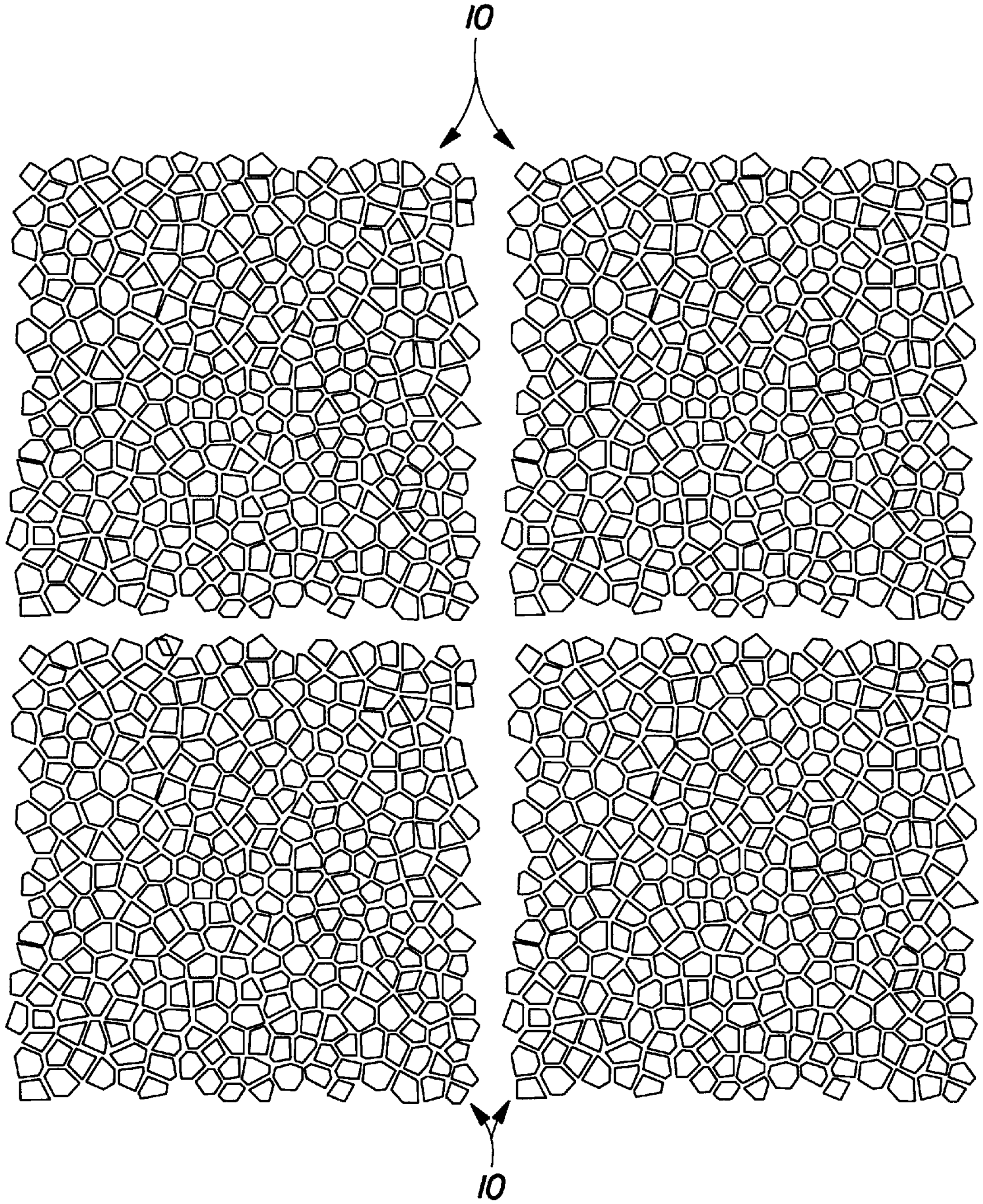
FIG. 2 PRIOR ART
FIG. 2 is a plan view of the four prior art "tiles" of FIG. 1 moved into closer proximity to illustrate the mismatch of the pattern edges.

FIG. 1 is an example of a pattern 10 created using the algorithm described in the previously referenced McGuire et al. application. Included in FIG. 1 are four identical "tiles" of the pattern 10 which have identical dimensions and are oriented in an identical fashion. If an attempt is made to "tile" this pattern, as shown in FIG. 2, by bringing the "tiles" 10 into closer proximity to form a larger pattern, obvious seams appear at the border of adjacent tiles or pattern elements. Such scams are visually distracting from the amorphous nature of the pattern and, in the case of a three-dimensional material made from a forming structure using such a pattern, the scams create disturbances in the physical properties of the material at the seam locations. Since the tiles 10 are identical, the seams created by bringing opposing edges of identical tiles together also illustrates the seams which would be formed if opposite edges of the same pattern element were brought together, such as by wrapping the pattern around a belt or roll.

Figure 3:
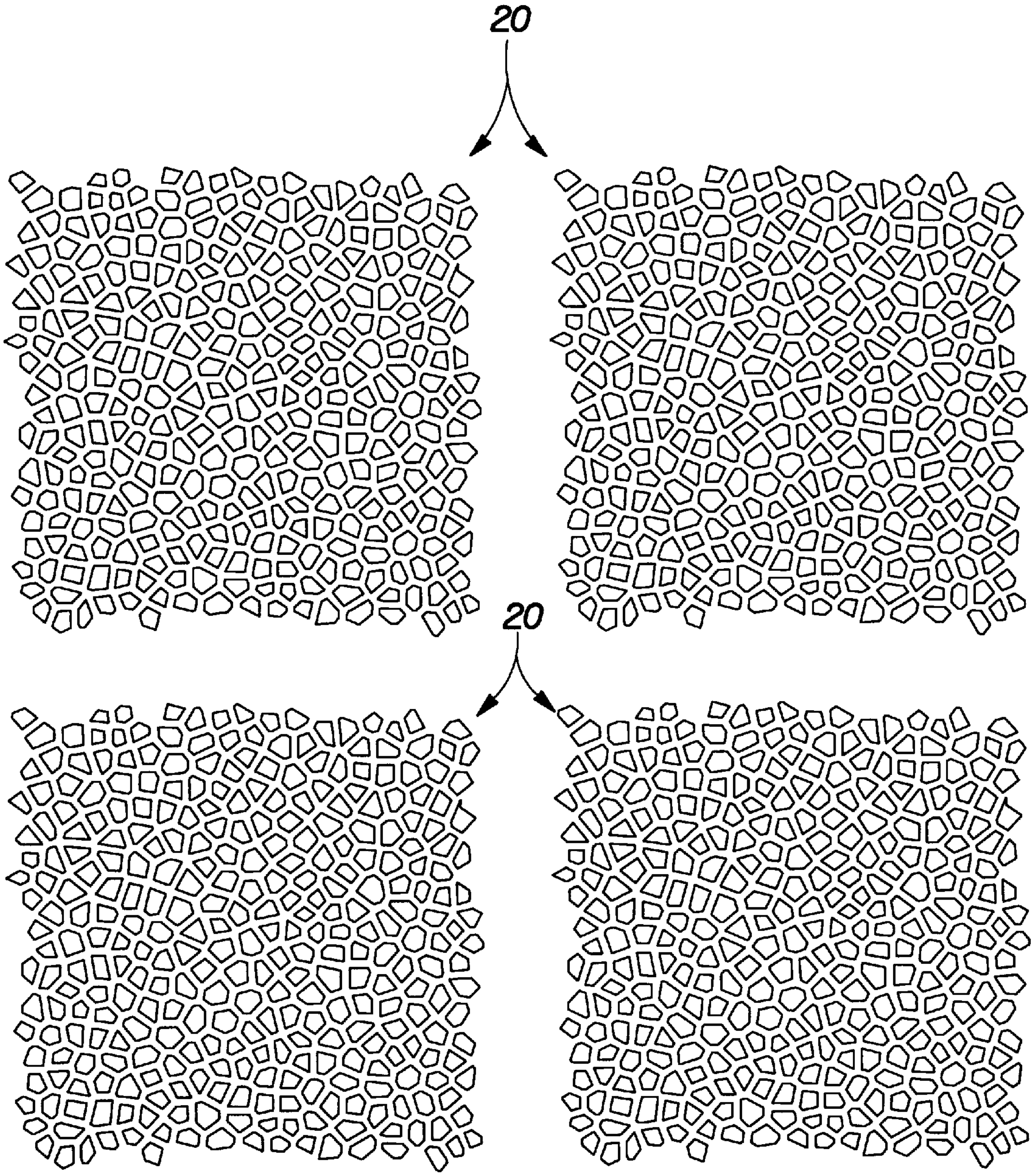
FIG. 3 is a plan view similar to FIG. 1 of four identical "tiles" of a representative embodiment of an amorphous pattern in accordance with the present invention.
Figure 4:
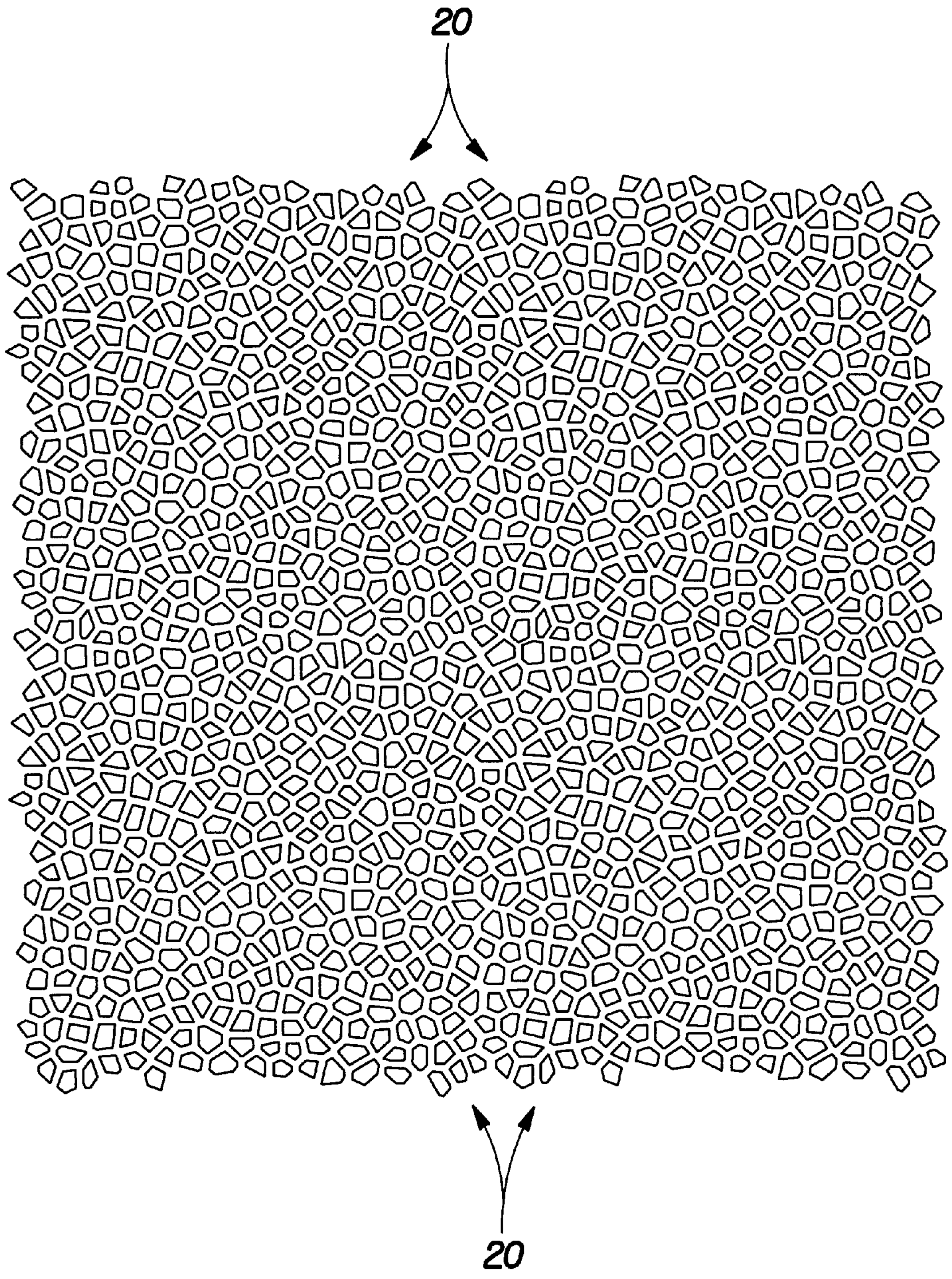
FIG. 4 is a plan view similar to FIG. 2 of the four "tiles" of FIG. 3 moved into closer proximity to illustrate the matching of the pattern edges.

In contrast, FIGS. 3 and 4 show similar views of a pattern 20 created using the algorithm of the present invention, as described below. It is obvious from FIGS. 3 and 4 that there is no appearance of a seam at the borders of the tiles 20 when they are brought into close proximity. Likewise, if opposite edges of a single pattern or tile were brought together, such as by wrapping the pattern around a belt or roll, the seam would likewise not be readily visually discernible.

As utilized herein, the tern "amorphous" refers to a pattern which exhibits no readily perceptible organization, regularity, or orientation of constituent elements. This definition of the term "amorphous" is generally in accordance with the ordinary meaning of the term as evidenced by the corresponding definition in *Webster's Ninth New Collegiate Dictionary*. In such a pattern, the orientation and arrangement of one element with regard to a neighboring element bear no predictable relationship to that of the next succeeding element(s) beyond.

By way of contrast, the term "array" is utilized herein to refer to patterns of constituent elements which exhibit a regular, ordered grouping or arrangement. This definition of the term "array" is likewise generally in accordance with the ordinary meaning of the term as evidenced by the corresponding definition in *Webster's Ninth New Collegiate Dictionary*. In such an array pattern, the orientation and arrangement of one element with regard to a neighboring element bear a predictable relationship to that of the next succeeding element(s) beyond.

The degree to which order is present in an array pattern of three-dimensional protrusions bears a direct relationship to the degree of nestability exhibited by the web. For example, in a highly-ordered array pattern of uniformly-sized and shaped hollow protrusions in a close-packed hexagonal array, each protrusion is literally a repeat of any other protrusion. Nesting of regions of such a web, if not in fact the entire web, can be achieved with a web alignment shift between superimposed webs or web portions of no more than one protrusion-spacing in any given direction. Lesser degrees of order may demonstrate less nesting tendency, although any degree of order is believed to provide some degree of nestability. Accordingly, an amorphous, non-order-ed pattern of protrusions would therefore exhibit the greatest possible degree of nesting-resistance.

Three-dimensional sheet materials having a two-dimensional pattern of three-dimensional protrusions which is substantially amorphous in nature are also believed to exhibit "isomorphism" . As utilized herein, the terms "isomorphism" and its root "isomorphic" are utilized to refer to substantial uniformity in geometrical and structural properties for a given circumscribed area wherever such an area is delineated within the pattern. This definition of the tern "isomorphic" is generally in accordance with the ordinary meaning of the tern as evidenced by the corresponding definition in *Webster's Ninth New Collegiate Dictionary*. By way of example, a prescribed area comprising a statistically-significant number of protrusions with regard to the entire amorphous pattern would yield statistically substantially equivalent values for such web properties as protrusion area, number density of protrusions, total protrusion wall length, etc. Such a correlation is believed desirable with respect to physical, structural web properties when uniformity is desired across the web surface, and particularly so with regard to web properties measured normal to the plane of the web such as crush-resistance of protrusions, etc.

Utilization of an amorphous pattern of three-dimensional protrusions has other advantages as well. For example, it has been observed that three-dimensional sheet materials formed from a material which is initially isotropic within the plane of the material remain generally isotropic with respect to physical web properties in directions within the plane of the material. As utilized herein, the term "isotropic" is utilized to refer to web properties which are exhibited to substantially equal degrees in all directions within the plane of the material. This definition of the term "isotropic" is likewise generally in accordance with the ordinary meaning of the tern as evidenced by the corresponding definition in *Webster's Ninth New Collegiate Dictionary*. Without wishing to be bound by theory, this is presently believed to be due to the non-ordered, non-oriented arrangement of the three-dimensional protrusions within the amorphous pattern. Conversely, directional web materials exhibiting web properties which vary by web direction will typically exhibit such properties in similar fashion following the introduction of the amorphous pattern upon the material. By way of example, such a sheet of material could exhibit substantially uniform tensile properties in any direction within the plane of the material if the starting material was isotropic in tensile properties.

Such an amorphous pattern in the physical sense translates into a statistically equivalent number of protrusions per unit length measure encountered by a line drawn in any given direction outwardly as a ray from any given point within the pattern. Other statistically equivalent parameters could include number of protrusion walls, average protrusion area, average total space between protrusions, etc. Statistical equivalence in terms of structural geometrical features with regard to directions in the plane of the web is believed to translate into statistical equivalence in terms of directional web properties.

Revisiting the array concept to highlight the distinction between arrays and amorphous patterns, since an array is by definition "ordered" in the physical sense it would exhibit some regularity in the size, shape, spacing, and/or orientation of protrusions. Accordingly, a line or ray drawn from a given point in the pattern would yield statistically different values depending upon the direction in which the ray extends for such parameters as number of protrusion walls, average protrusion area, average total space between protrusions, etc. with a corresponding variation in directional web properties.

Within the preferred amorphous pattern, protrusions will preferably be non-uniform with regard to their size, shape, orientation with respect to the web, and spacing between adjacent protrusion centers. Without wishing to be bound by theory, differences in center-to-center spacing of adjacent protrusions are believed to play ail important role in reducing the likelihood of nesting occurring in the face-to-back nesting scenario. Differences in center-to-center spacing of protrusions in the pattern result in the physical sense in the spaces between protrusions being located in different spatial locations with respect to the overall web. Accordingly, the likelihood of a "match" occurring between superimposed portions of one or more webs in terms of protrusions/space locations is quite low. Further, the likelihood of a "match" occurring between a plurality of adjacent protrusions/spaces on superimposed webs or web portions is even lower due to the amorphous nature of the protrusion pattern.

In a completely amorphous pattern, as would be presently preferred, the center-to-center spacing is random, at least within a designer-specified bounded range, such that there is an equal likelihood of the nearest neighbor to a given protrusion occurring at any given angular position within the plane of the web. Other physical geometrical characteristics of the web are also preferably random, or at least non-uniform, within the boundary conditions of the pattern, such as the number of sides of the protrusions, angles included within each protrusion, size of the protrusions, etc. However, while it is possible and in some circumstances desirable to have the spacing between adjacent protrusions be non-uniform and/or random, the selection of polygon shapes which are capable of interlocking together makes a uniform spacing between adjacent protrusions possible. This is particularly useful for some applications of the three-dimensional, nesting-resistant sheet materials of the present invention, as will be discussed hereafter.

As used herein, the term "polygon" (and the adjective form "polygonal") is utilized to refer to a two-dimensional geometrical figure with three or more sides, since a polygon with one or two sides would define a line. Accordingly, triangles, quadrilaterals, pentagons, hexagons, etc. are included within the term "polygon", as would curvilinear shapes such as circles, ellipses, etc. which would have an infinite number of sides.

When describing properties of two-dimensional structures of non-uniform, particularly non-circular, shapes and non-uniform spacing, it is often useful to utilize "average" quantities and/or "equivalent" quantities. For example, in terms of characterizing linear distance relationships between objects in a two-dimensional pattern, where spacings on a center-to-center basis or on an individual spacing basis, an "average" spacing tern may be useful to characterize the resulting structure. Other quantities that could be described in terms of averages would include the proportion of surface area occupied by objects, object area, object circumference, object diameter, etc. For other dimensions such as object circumference and object diameter, an approximation can be made for objects which are non-circular by constructing a hypothetical equivalent diameter as is often done in hydraulic contexts.

A totally random pattern of three-dimensional hollow protrusions in a web would, in theory, never exhibit face-to-back nesting since the shape and alignment of each frustum would be unique. However, the design of such a totally random pattern would be very time-consuming and complex proposition, as would be the method of manufacturing a suitable forming structure. In accordance with the present invention, the non-nesting attributes may be obtained by designing patterns or structures where the relationship of adjacent cells or structures to one another is specified, as is the overall geometrical character of the cells or structures, but wherein the precise size, shape, and orientation of the cells or structures is non-uniform and non-repeating. The term "non-repeating", as utilized herein, is intended to refer to patterns or structures where an identical structure or shape is not present at any two locations within a defined area of interest. While there may be more than one protrusion of a given size and shape within the pattern or area of interest, the presence of other protrusions around them of non-uniform size and shape virtually eliminates the possibility of an identical grouping of protrusions being present at multiple locations. Said differently, the pattern of protrusions is non-uniform throughout the area of interest such that no grouping( of protrusions within the overall pattern will be the same as any other like grouping of protrusions. The beam strength of the three-dimensional sheet material will prevent significant nesting of any region of material surroundinig a given protrusion even in the event that that protrusion finds itself superimposed over a single matching depression since the protrusions surrounding the single protrusion of interest will differ in size, shape, and resultant center-to-center spacing from those surrounding the other protrusion/depression.

Professor Davies of the University of Manchester has been studying porous cellular ceramic membranes and, more particularly, has been generating analytical models of such membranes to permit mathematical modeling to simulate real-world performance. This work was described in greater detail in a publication entitled "Porous cellular ceramic membranes: a stochastic model to describe the structure of an anodic oxide membrane", authored by J. Broughton and G. A. Davies, which appeared in the *Journal of Membrane Science*, Vol. 106 (1995), at pp. 89–101, the disclosure of which is hereby incorporated herein by reference. Other related mathematical modeling techniques are described in greater detail in "Computing the n-dimensional Delaunay tessellation with application to Voronoi polytopes", authored by D. F. Watson, which appeared in *The Computer Journal*, Vol. 24, No. 2 (1981), at pp. 167–172, and "Statistical Models to Describe the Structure of Porous Ceramic Membranes", authored by J. F. F. Lim, X. Jia, R. Jafferali, and G. A. Davies, which appeared in *Separation Science and Technology*. 28(1–3) (1993) at pp. 821–854, the disclosures of both of which are hereby incorporated herein by reference.

As part of this work, Professor Davies developed a two-dimensional polygonal pattern based upon a constrained Voronoi tessellation of 2-space. In such a method, again with reference to the above-identified publication, nucleation points are placed in random positions in a bounded (pre-determined) plane which are equal in number to the number of polygons desired in the finished pattern. A computer program "grows" each point as a circle simultaneously and radially from each nucleation point at equal rates. As growth fronts from neighboring nucleation points meet, growth stops and a boundary line is formed. These boundary lines each form the edge of a polygon, with vertices formed by intersections of boundary lines.

While this theoretical background is useful in understanding how such patterns may be generated and the properties of such patterns, there remains the issue of performing the above numerical repetitions step-wise to propagate the nucleation points outwardly throughout the desired field of interest to completion. Accordingly, to expeditiously carry out this process a computer program is preferably written to perform these calculations given the appropriate boundary conditions and input parameters and deliver the desired output.

The first step in generating a pattern in accordance with the present invention is to establish the dimensions of the desired pattern. For example, if it is desired to construct a pattern 10 inches wide and 10 inches long, for optionally forming into a drum or belt as well as a plate, then an X-Y coordinate system is established with the maximum X dimension ($x_{max}$) being 10 inches and the maximum Y dimension ($y_{max}$) being 10 inches (or vice-versa).

Figure 5:
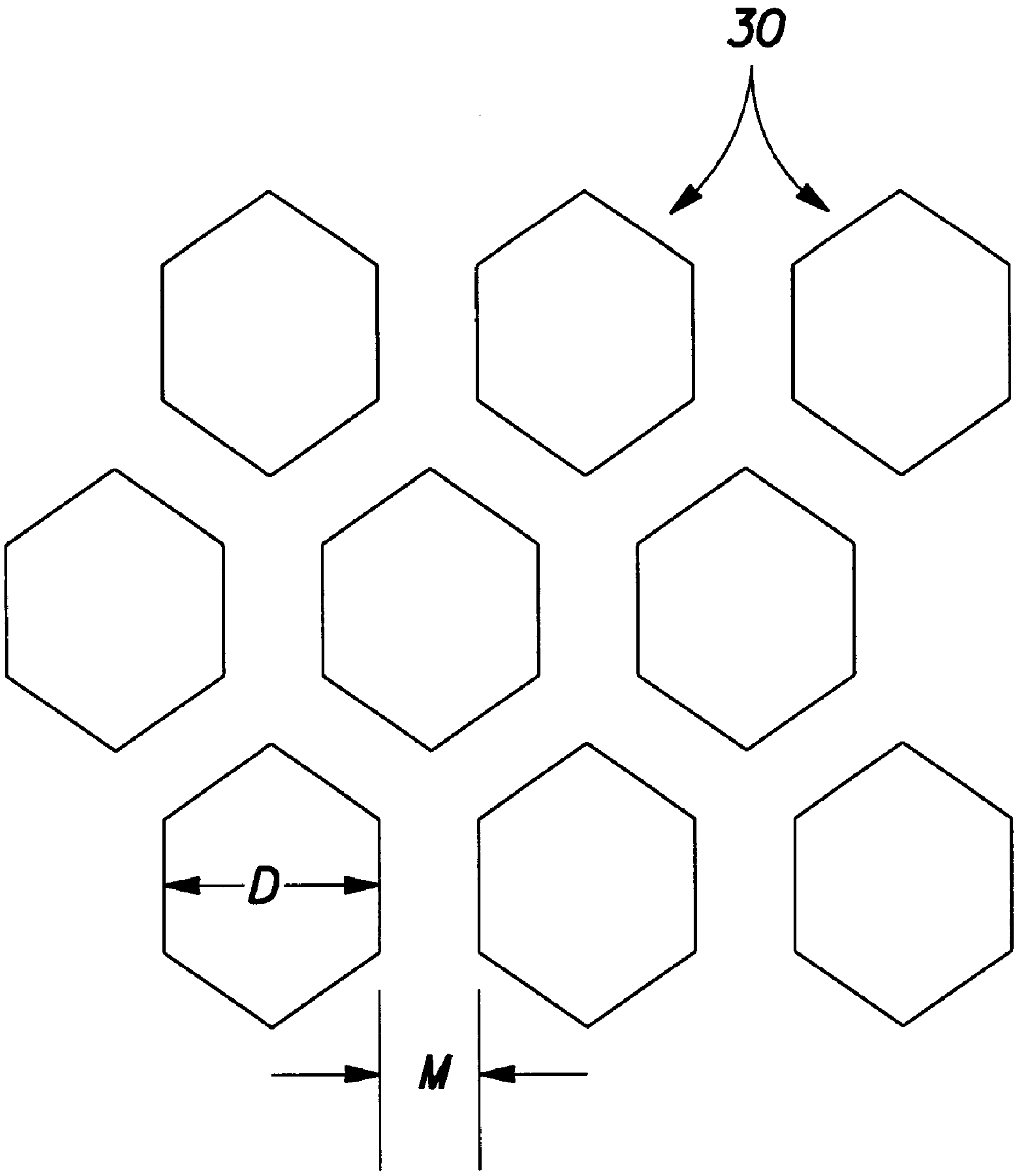
FIG. 5 is a schematic illustration of dimensions referenced in the pattern generation equations of the present invention.

After the coordinate system and maximum dimensions are specified, the next step is to determine the number of "nucleation points" which will become polygons desired within the defined boundaries of the pattern. This number is an integer between 0 and infinity, and should be selected with regard to the average size and spacing of the polygons desired in the finished pattern. Larger numbers correspond to smaller polygons, and vice-versa. A useful approach to determining the appropriate number of nucleation points or polygons is to compute the number of polygons of an artificial, hypothetical, uniform size and shape that would be required to fill the desired forming structure. If this artificial pattern is an array of regular hexagons 30 (see FIG. 5), with D being the edge-to-edge dimension and M being the spacing between the hexagons, then the number density of hexagons, N, is:

$$N = \frac{2\sqrt{3}}{3(D+M)^2}$$

It has been found that using this equation to calculate a nucleation density for the amorphous patterns generated as described herein will give polygons with average size closely approximating the size of the hypothetical hexagons (D). Once the nucleation density is known, the total number of nucleation points to be used in the pattern can be calculated by multiplying by the area of the pattern (80 $in^2$ in the case of this example).

A random number generator is required for the next step. Any suitable random number generator known to those skilled in the art may be utilized, including those requiring a "seed number" or utilizing an objectively determined starting value such as chronological time. Many random number generators operate to provide a number between zero and one (0–1), and the discussion hereafter assumes the use of such a generator. A generator with differing output may also be utilized if the result is converted to some number between zero and one or if appropriate conversion factors are utilized.

A computer program is written to run the random number generator the desired number of iterations to generate as many random numbers as is required to equal twice the desired number of "nucleation points" calculated above. As the numbers are generated, alternate numbers are multiplied by either the maximum X dimension or the maximum Y dimension to generate random pairs of X and Y coordinates all having X values between zero and the maximum X dimension and Y values between zero and the maximum Y dimension. These values are then stored as pairs of (X,Y) coordinates equal in number to the number of "nucleation points".

Figure 6:
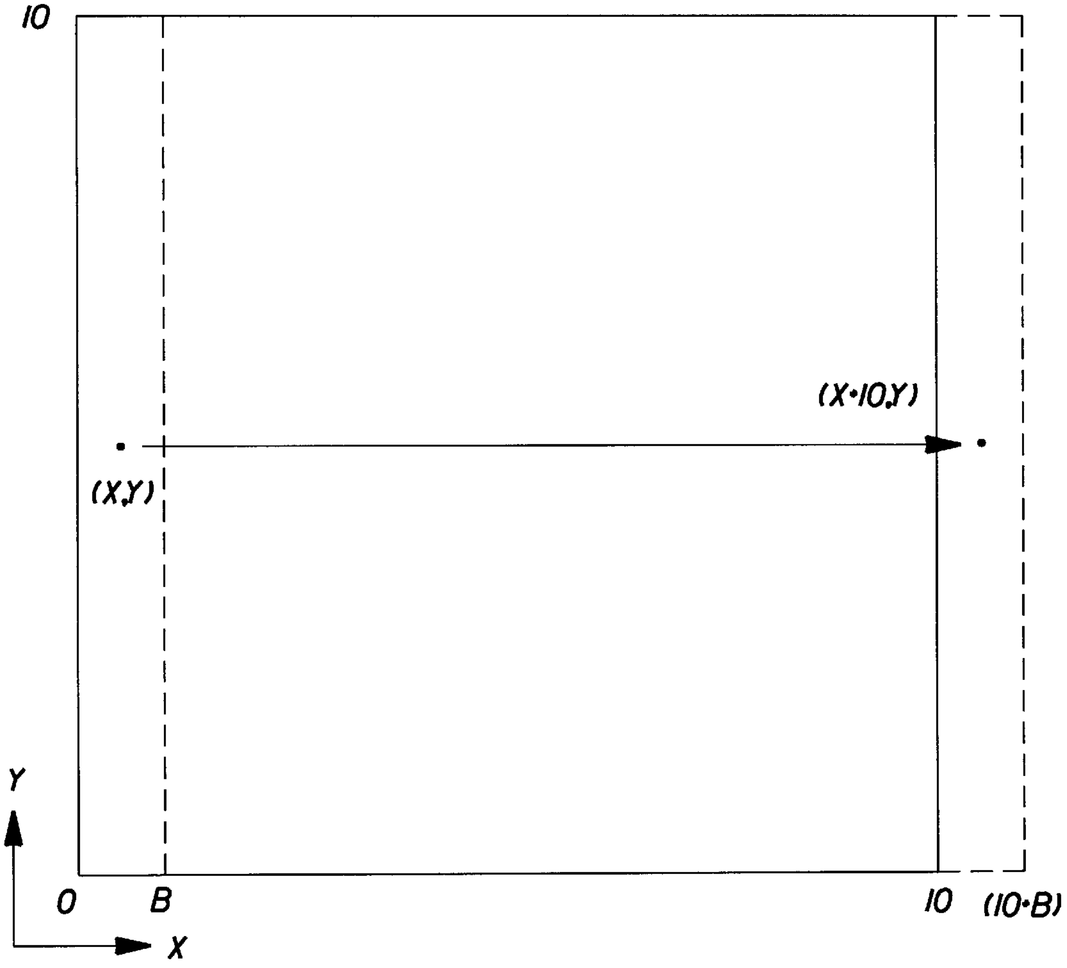
FIG. 6 is a schematic illustration of dimensions referenced in the pattern generation equations of the present invention.

It is at this point, that the invention described herein differs from the pattern generation algorithm described in the previous McGuire et al. application. Assuming that it is desired to have the left and right edge of the pattern "mesh", i.e., be capable of being "tiled" together, a border of width B is added to the right side of the 10" square (see FIG. 6). The size of the required border is dependent upon the nucleation density; the higher the nucleation density, the smaller is the required border size. A convenient method of computing the border width, B, is to refer again to the hypothetical regular hexagon array described above and shown in FIG. 5. In general, at least three columns of hypothetical hexagons should be incorporated into the border, so the border width can be calculated as:

$$B=3(D+H)$$

Now, any nucleation point P with coordinates (x,y) where x<B will be copied into the border as another nucleation point, P', with a new coordinate ($x_{max}$+x,y).

If the method described in the preceding paragraphs is utilized to generate a resulting pattern, the pattern will be truly random. This truly random pattern will, by its nature, have a large distribution of polygon sizes and shapes which may be undesirable in some instances. In order to provide some degree of control over the degree of randomness associated with the generation of "nucleation point" locations, a control factor or "constraint" is chosen and referred to hereafter as β (beta). The constraint limits the proximity of neighboring nucleation point locations through the introduction of an exclusion distance, E, which represents the minimum distance between any two adjacent nucleation points. The exclusion distance E is computed as follows:

$$E = \frac{2\beta}{\sqrt{\lambda\pi}}$$

where λ (lambda) is the number density of points (points per unit area) and β ranges from 0 to 1.

To implement the control of the "degree of randomness", the first nucleation point is placed as described above. β is then selected, and E is calculated from the above equation. Note that β, and thus E, will remain constant throughout the placement of nucleation points. For every subsequent nucleation point (x,y) coordinate that is generated, the distance from this point is computed to every other nucleation point that has already been placed. If this distance is less than E for any point, the newly-generated (x,y) coordinates are deleted and a new set is generated. This process is repeated until all N points have been successfully placed. Note that in the tiling algorithm of the present invention, for all points (x,y) where x<B, both the original point P and the copied point P' must be checked against all other points. If either P or P' is closer to any other point than E, then both P and P' are deleted, and a new set of random (x,y) coordinates is generated.

If β=0, then the exclusion distance is zero, and the pattern will be truly random. If β=1, the exclusion distance is equal to the nearest neighbor distance for a hexagonally close-packed array. Selecting β between 0 and 1 allows control over the "degree of randomness" between these two extremes.

In order to make the pattern a tile in which both the left and right edges tile properly and the top and bottom edges tile properly, borders will have to be used in both the X and Y directions.

Once the complete set of nucleation points are computed and stored, a Delaunay triangulation is performed as the precursor step to generating the finished polygonal pattern. The use of a Delaunay triangulation in this process constitutes a simpler but mathematically equivalent alternative to iteratively "growing" the polygons from the nucleation points simultaneously as circles, as described in the theoretical model above. The theme behind performing the triangulation is to generate sets of three nucleation points forming triangles, such that a circle constructed to pass through those three points will not include any other nucleation points within the circle. To perform the Delaunay triangulation, a computer program is written to assemble every possible combination of three nucleation points, with each nucleation point being assigned a unique number (integer) merely for identification purposes. The radius and center point coordinates are then calculated for a circle passing through each set of three triangularly-arranged points. The coordinate locations of each nucleation point not used to define the particular triangle are then compared with the coordinates of the circle (radius and center point) to determine whether any of the other nucleation points fall within the circle of the three points of interest. If the constructed circle for those three points passes the test (no other nucleation points falling within the circle), then the three point numbers, their X and Y coordinates, the radius of the circle, and the X and Y coordinates of the circle center are stored. If the constructed circle for those three points fails the test, no results are saved and the calculation progresses to the next set of three points.

Once the Delaunay triangulation has been completed, a Voronoi tessellation of 2-space is then performed to generate the finished polygons. To accomplish the tessellation, each nucleation point saved as being a vertex of a Delaunay triangle forms the center of a polygon. The outline of the polygon is then constructed by sequentially connecting the center points of the circumscribed circles of each of the Delaunay triangles, which include that vertex, sequentially in clockwise fashion. Saving these circle center points in a repetitive order such as clockwise enables the coordinates of the vertices of each polygon to be stored sequentially throughout the field of nucleation points. In generating the polygons, a comparison is made such that any triangle vertices at the boundaries of the pattern are omitted from the calculation since they will not define a complete polygon.

If it is desired for ease of tiling multiple copies of the same pattern together to form a larger pattern, the polygons generated as a result of nucleation points copied into the computational border may be retained as part of the pattern and overlapped with identical polygons in an adjacent pattern to aid in matching polygon spacing and registry. Alternatively, as shown in FIGS. 3 and 4, the polygons generated as a result of nucleation points copied into the computational border may be deleted after the triangulation and tessellation are performed such that adjacent patterns may be abutted with suitable polygon spacing.

Once a finished pattern of interlocking polygonal two-dimensional shapes is generated, in accordance with the present invention such a network of interlocking shapes is utilized as the design for one web Surface of a web of material with tile pattern defining the shapes of the bases of the three-dimensional, hollow protrusions formed from the initially planar web of starting material. In order to accomplish this formation of protrusions from an initially planar web of starting material, a suitable forming structure comprising a negative of the desired finished three-dimensional structure is created which the starting material is caused to conform to by exerting suitable forces sufficient to permanently deform the starting material.

From the completed data file of polygon vertex coordinates, a physical output such as a line drawing may be made of the finished pattern of polygons. This pattern may be utilized in conventional fashion as the input pattern for a metal screen etching process to form a three-dimensional forming structure. If a greater spacing between the polygons is desired, a computer program can be written to add one or more parallel lines to each polygon side to increase their width (and hence decrease the size of the polygons a corresponding amount).

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A method of creating an amorphous two-dimensional pattern of interlocking two-dimensional geometrical shapes having at least two opposing edges which can be tiled together, said method comprising the steps of:

(a) specifying the width $x_{max}$ of said pattern measured in direction x between said opposing edges;

(b) adding a computational border region of width B to said pattern along one of said edges located at the x distance $x_{max}$.

c) computationally generating (x,y) coordinates of a nucleation point having x coordinates between 0 and $x_{max}$;

(d) selecting nucleation points having x coordinates between 0 and B and copying them into said computational border region by adding $x_{max}$ to their x coordinate value;

(e) comparing both the computationally generated nucleation point and the corresponding copied nucleation point in said computational border against all previously generated nucleation points; and (f) repeating steps (c) through (e) until the desired number of nucleation points has been generated.

2. The method of claim 1, wherein said pattern includes at least two pairs of opposing edges, each pair of opposing edges being capable of being tiled together.

3. The method of claim 1, further comprising the steps of:

(g) performing a Delaunay triangulation on said nucleation points; and (h) performing a Voronoi tessellation on said nucleation points to form said two-dimensional geometrical shapes.

4. The method of claim 1, wherein said pattern includes two mutually orthogonal coordinate directions x and y, and wherein nucleation points are copied into a computational border in each coordinate direction.

5. The method of claim 1, wherein said step of comparing said nucleation points includes a control factor to control the degree of randomness of said pattern.

6. The method of claim 1, wherein the width B of said computational border is at least equal to the width of three columns of hypothetical hexagons.

7. The method of claim 1, wherein said method includes the step of generating two-dimensional geometrical shapes from said nucleation points.

8. The method of claim 7, wherein said method includes the step of deleting two-dimensional geometrical shapes resulting from copied nucleation points.

9. The method of claim 7, wherein said method includes the step of saving two-dimensional geometrical shapes resulting from copied nucleation points.

10. The method of claim 7, wherein said method includes the step of generating a physical output of the finished pattern of two-dimensional geometrical shapes.

* * * * *

UNITED STATES PATENT AND TRADEMARK OFFICE
CERTIFICATE OF CORRECTION

PATENT NO. : 6,421,052 B1
DATED : July 16, 2002
INVENTOR(S) : Kenneth S. McGuire It is certified that error appears in the above-identified patent and that said Letters Patent is hereby corrected as shown below:

Column 2,
Lines 64 and 67, "scams" should read -- seams --.

Column 3,
Line 15, "tern" should read -- term --.
Line 49, "non-order-ed" should read -- non-ordered --.
Lines 58 and 60, "tern" should read -- term --.

Column 4,
Lines 11 and 16, "tern" should read -- term --.
Line 56, "ail" should read -- an --.

Column 5,
Line 34, "tern" should read -- term --.

Column 6,
Line 3, "surroundinig" should read -- surrounding --.

Signed and Sealed this

Twenty-second Day of July, 2003

JAMES E. ROGAN
*Director of the United States Patent and Trademark Office*